May 17, 1960 S. SCHALKOWSKY ET AL 2,936,624
ROTATING PENDULUM ACCELEROMETER
Filed Dec. 19, 1958 3 Sheets-Sheet 1

INVENTORS
SAMUEL SCHALKOWSKY
HENRY BLAZEK
IRWIN S. TOLINS

BY *Borst and Borst* ATTORNEYS

VARIATION OF TIME DIFFERENCE WITH PERIOD.

INVENTORS
SAMUEL SCHALKOWSKY
HENRY BLAZEK
IRWIN S. TOLINS

May 17, 1960 S. SCHALKOWSKY ET AL 2,936,624
ROTATING PENDULUM ACCELEROMETER
Filed Dec. 19, 1958 3 Sheets-Sheet 3

INVENTORS
SAMUEL SCHALKOWSKY
HENRY BLAZEK
IRWIN S. TOLINS
BY ATTORNEYS

United States Patent Office 2,936,624
Patented May 17, 1960

2,936,624
ROTATING PENDULUM ACCELEROMETER

Samuel Schalkowsky, Pearl River, Henry Blazek, Nyack, and Irwin S. Tolins, Long Island City, N.Y., assignors to Sperry Rand Corporation, Ford Instrument Company Division, Wilmington, Del., a corporation of Delaware Application December 19, 1958, Serial No. 781,686

10 Claims. (Cl. 73—516)

This invention relates to acceleration censing instruments and to digital computers employing acceleration sensors and having a capacity to transform the physical output of sensors to a form suitable for computation purposes and generate useful information regarding the translational movements of vehicles.

In general, acceleration sensors may be designed to operate on the principle of balanced forces or torques acting on a mass or of observation of the motion of a mass where motion is permitted. Techniques involving balance of forces and balance of torques applied as to an oscillatory pendulum require a highly precise measurement of the force applied to restrain the force of acceleration exerted on the mass and the nulling systems employed to insure the needed balance are complex. On the other hand instruments which function by observing the translation of a freely falling mass require precise measurement of the small displacements involved as well as means for releasing the mass in a parallel alignment with respect to a reference and without applying forces that disturb that alignment.

This invention contemplates an accelerometer which has as a sensing device an instrument having an unbalanced mass for a pendulum, which is rotationally responsive to the motion of the accelerometer, the latter also providing means for observing the rotation of the pendulum and yielding information derived from data based on its observing capability. Further, the invention envisions an uniquely designed sensing device composed of an unbalanced cylinder supported in air bearings which cause the cylinder to rotate at a constant rate of angular velocity when the translational velocity of the device is constant and permit the angular velocity to be predictably modulated when the translational velocity changes during acceleration so that the accelerometer with which the sensing device is associated is enabled to measure the modulation and furnish an output proportional to the acceleration which occasioned the modulation.

One object of the invention is to provide an accelerometer which is capable of yielding an output which is proportional to the rotation modulation of a mass subjected to a force of acceleration.

Another object of the invention is to provide an acceleration sensor uniquely designed to be highly sensitive to externally applied forces due to the motion of the carrier for the sensor.

A further object of the invention is to provide a method of computation which will yield a value of acceleration which is independent of the magnitude of the driving torque or of the damping which may result from the pendulum bearing.

Other objects and advantages of the invention may be perceived on reading the following detailed description of one embodiment thereof which is taken in conjunction with the accompanying drawings in which Fig. 1 is a general block diagram of the accelerometer.

Figures 1, 2:
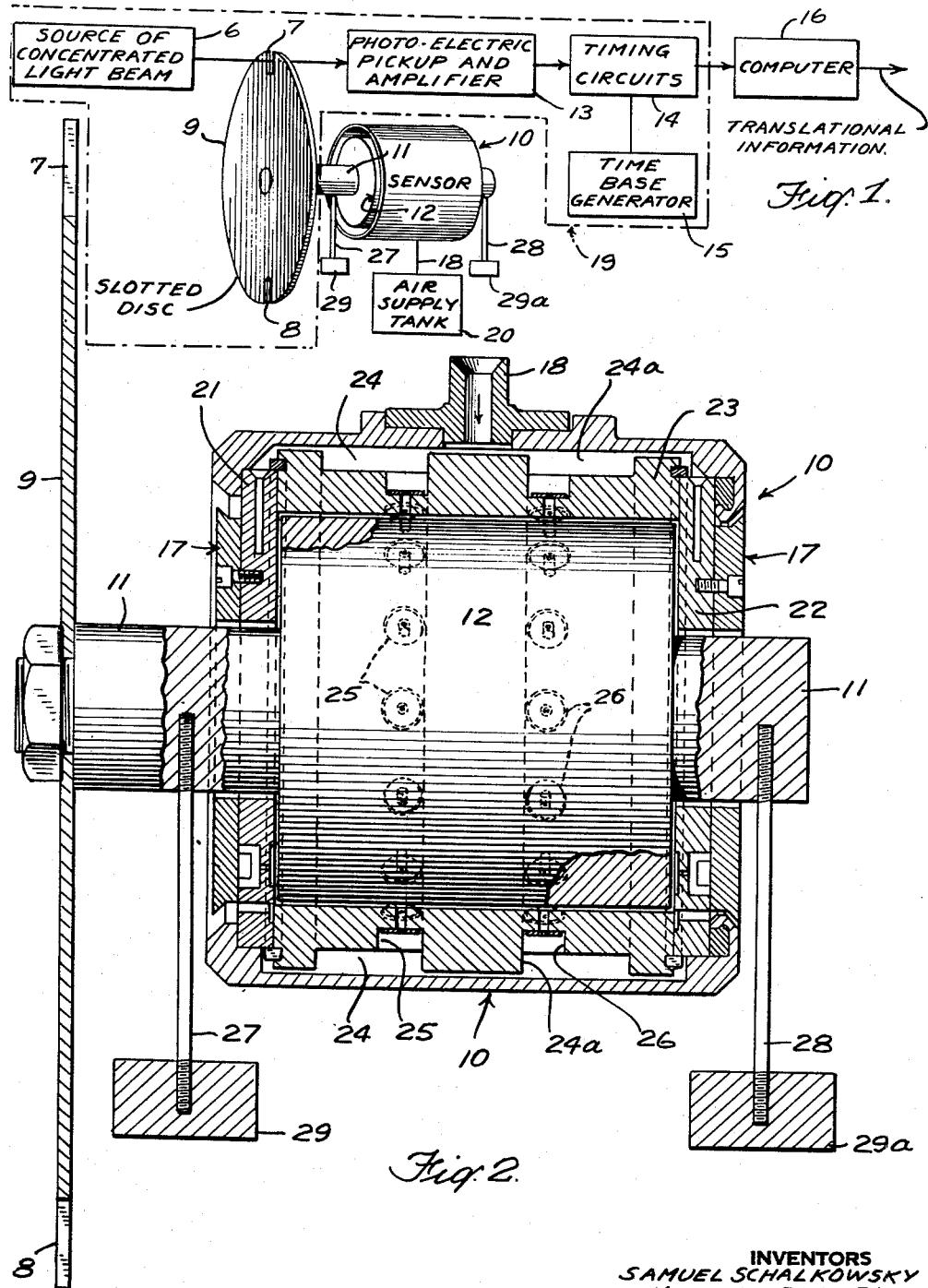
Fig. 2 is an elevation in section of the acceleration sensor.
Figure 3:
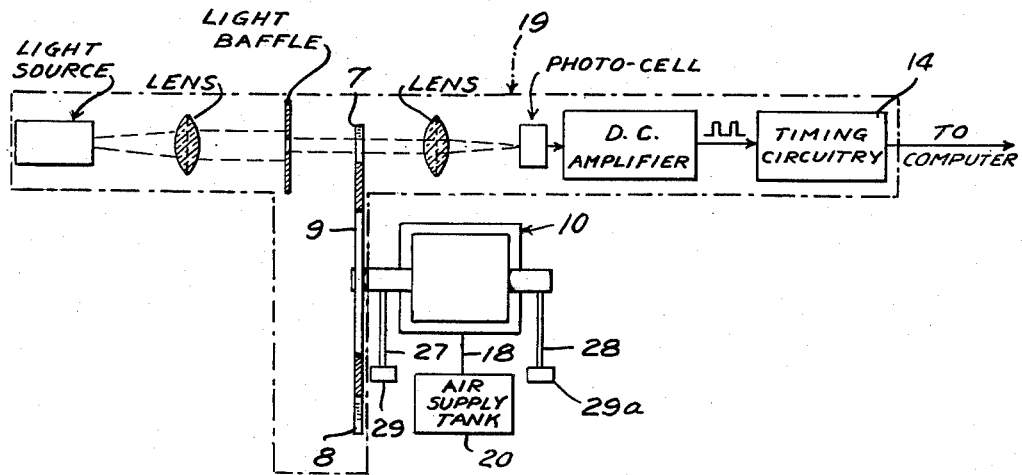
Fig. 3 is a schematic of the optical transducer employed by the accelerometer.

Referring to the general arrangement of the accelerometer shown in Fig. 1, a source of light 6 is disposed so that it is capable of projecting a beam of light alternately through two slots 7 and 8 formed in a disc 9 as the disc is rotated by the sensor 10. The disc is mounted on an axial extension 11 of a rotatable cylinder 12 provided by the sensor. The light which has passed through the slots of the disc 9 is allowed to fall on a light sensitive element of the photoelectric pickup and amplifier 13 which transmits amplified pulses to timing circuits 14 referenced by time base generator 15. The pulses transmitted to acceleration computer 16 by the timing circuits 14 afford an indication of the time occurring between the passage of light by the two slots in the rotating disc 9. The photoelectric pickup and amplifier 13, the timing circuits 14, the generator 15, the light source 6 and the slotted disc 9 make up the transducer 19 for the system.

Referring to Fig. 2, the sensor 10 comprises a housing 17 to which air is admitted through the air inlet, pipe fitting 18 provided in the housing 17, the air being supplied thereto by an air supply tank 20 shown in Fig. 1 in communication with the sensor. Vertically disposed within the housing 17 and secured to one side thereof is front plate 21, to the other side is secured back plate 22. An outer sleeve 23 is supported by the plates 21 and 22 within the housing 17. The sleeve is provided with manifolds 24 and 24a annularly formed in the surface of the cylinder and located equidistantly from the fitting 18. Manifolds 24 and 24a are, respectively, provided with a series of counterbores 25 and 26 each of which communicates through orifices to the interior of the sleeve 23. The rotatable cylinder 12 mounted on the shaft 11 is disposed within the sleeve 23 and the vertical plates 21 and 22. The orifices of the counterbores 25 and 26 communicate with the air space between the cylinder and sleeve. Connected to the axial extensions 11 of the inner cylinder on each side of the housing are rods 27 and 28 which support the cylinder unbalancing masses 29 and 29a, respectively, on their free ends. Preferably, the rotatable cylinder 12 is an inch in diameter with the unbalanced masses of 1.084 grams each and suspended an inch from the cylinder center line.

In the absence of applied acceleration, the cylinder in the sensor will rotate at a constant angular velocity when the sensor itself is caused to translate at a constant velocity. The torque causing the rotation is called turbine torque which manifests itself as torques about the output axis of the sensor and is the result of the unsymmetrical transfer of momentum from the air film to the inner cylinder. The torque causing rotation can also be an externally applied torque which counters viscous torques and turbine torques so as to generate a net constant rotation. This could be accomplished, for example, by utilizing a motor action where the source of energy would be electrical. When the sensor is accelerating, circumferential flow about the inner cylinder is caused by the load or pressure differential in the air bearings. This differential develops when the applied acceleration causes the inner cylinder to translate slightly within the air bearing in a radial direction. The resulting different gap thicknesses on opposite sides of the inner cylinder create the required differential to the extent that the resulting circumferential flow is nonsymmetrical about the direction of acceleration.

The rotation of the inner cylinder is subject to damping as a result of the relative motion of the cylinder and sleeve surfaces which are separated by the air film. Damping can be very considerably reduced by reducing the diameter and length of the inner cylinder and increasing the diametric clearance in the air bearing. While damping torque must be present to some extent to decelerate the rotating inner cylinder, it is shown below that the accelerometer can be designed to operate independently of this hold back torque.

Figure 5:
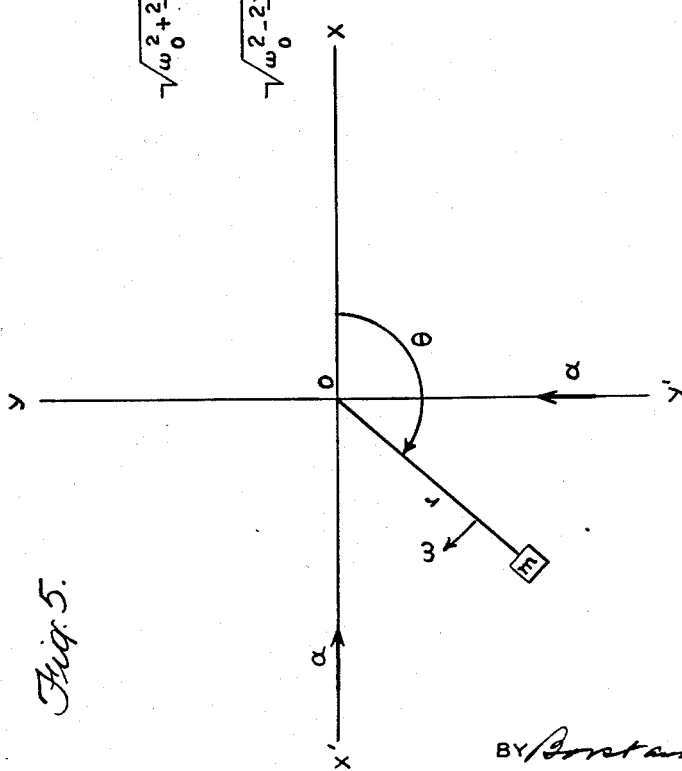
Fig. 5 is an idealized motion diagram of the basic sensor.

It is assumed that the inner cylinder, which is acted on by turbine torque and viscous damping torque can be made to rotate at a constant angular velocity. However, acceleration of the sensor will modulate the angular velocity of the rotating cylinder and cause it to alternately speed up and slow down during each of its revolutions. Perhaps this may be better understood by considering the idealized configuration of a rotating pendulum shown in Fig. 5 consisting of a point mass suspended on a weightless rigid bar at a distance $r$ from a point O. The mass $m$ rotates in the plane of the paper about a frictionless bearing located on the point O. In the absence of external forces, the mass $m$ will continuously rotate at its initial angular velocity.

Acceleration of the point O within the plane of the paper will develop forces on the mass $m$ which will alternately speed up and slow down the rotating mass (providing the force on the mass is not great enough to stop the rotation and align the supporting bar with the acceleration vector). Thus, acceleration will modulate the angular velocity of the rotating mass. A measure of this modulation provides information on the applied acceleration.

Figure 6:
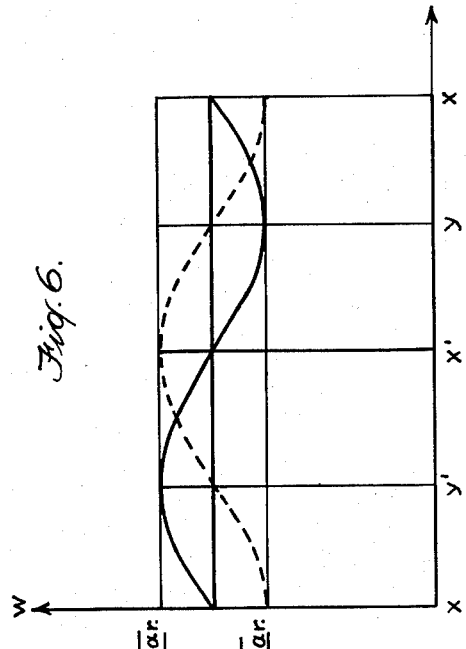
Fig. 6 is a graph illustrating the modulation characteristics of the basic sensor due to applied acceleration.

For acceleration $a$ along axis $y'y$ (Figure 5), the mass $m$ will accelerate while moving between $y$ and $y'$ and decelerate between $y'$ and $y$ (with $w$ directed as shown in Figure 2). Figure 6 shows graphically how the instantaneous angular velocity $w$ passes through maxima and minima as a function of angular rotation; the variation is periodic. Acceleration applied in any other direction will cause an angular velocity modulation which is out of phase with that due to $a$. This is illustrated in Figure 6, the dotted curve indicating the modulation due to $a'$ which is directed along the $x'x$ axis. Since the acceleration vectors are displaced by 90°, the maxima of the respective modulation curves are likewise displaced 90°. Thus, the basic sensor is found to be a phase sensitive device capable of providing information on both magnitude and direction of the component of applied acceleration normal to axis at rotation of the pendulum.

The torque equation for the idealized configuration under the influence of an applied acceleration is:

$$I\ddot{\theta} = mar \cos \theta \quad (1)$$

where I is the moment of inertia of the mass $m$ about the point O, $\theta$ is a radian angle and $\ddot{\theta}$ is angular acceleration. Simple integration of the above equation will indicate the occurrence of periodic maximum and minimum values of angular velocity $w$. If $\omega_0$ is the angular velocity of the mass $m$ when the bar is along axis $x'x$ and acceleration $a$ is applied, the maximum value, occurring at $y'$, is found to be $$\omega_{max} = \sqrt{\omega_0^2 + \frac{2mar}{I}} \quad (2)$$

and the minimum value, occurring at $y$ is $$\omega_{min} = \sqrt{\omega_0^2 - \frac{2mar}{I}} \quad (3)$$

Figure 4:
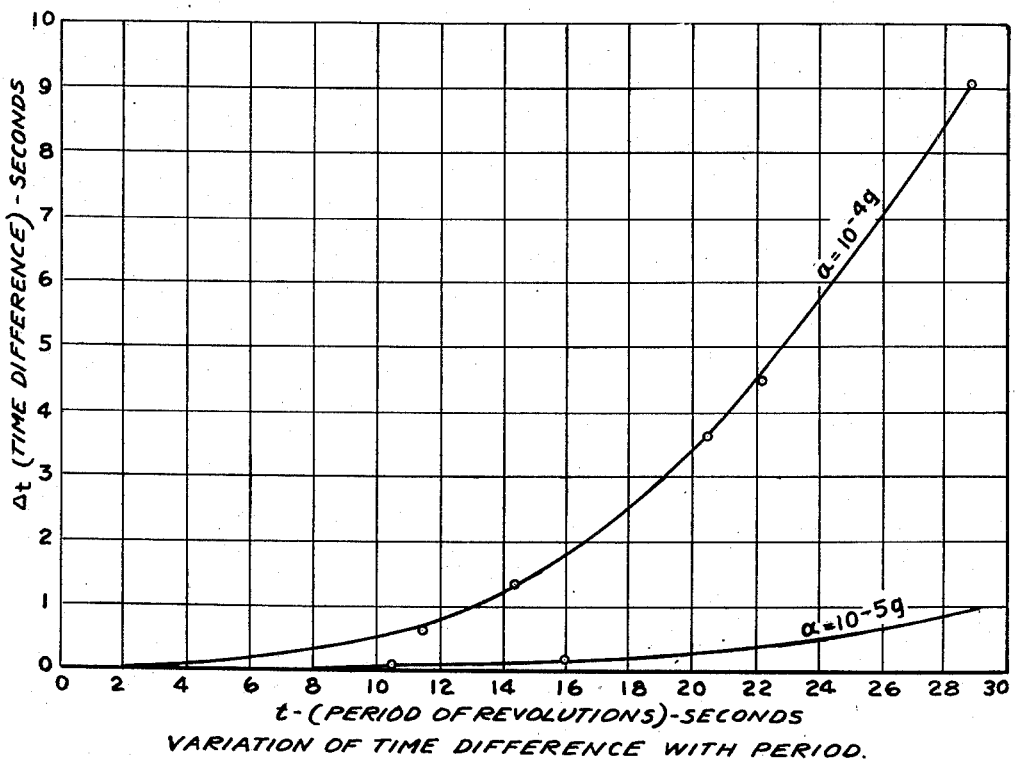
Fig. 4 is a graph showing a plot of the period and half cycle time differential of the rotating sensor for two acceleration parameters.

Modulation of the rotating pendulum, which in the preferred embodiment of invention is the inner cylinder 11, under the force of acceleration is measurable in terms of the period, $\tau$, of a complete revolution of the air bearing cylindrical pendulum and the time difference, $\Delta t$, between the times required to traverse two half cycles of rotation. It may be mathematically demonstrated that these time measurements, $\tau$ and $\Delta t$, are related to the applied acceleration $a$ and, further, that they serve to uniquely define $a$ if the system is assumed to be conservative. In Figure 4 a graph of $\Delta t$ versus $\tau$ is presented for two values of acceleration where turbine torque and damping torque are equal to zero. Solutions for acceleration, $a$, were derived from the idealized torque Equation 1. Similarly, solution for angular acceleration, $\ddot{\theta}$, may be found for a rotating cylinder assuming all external torques are acting thereon. To this end, Equation 1 may be expanded to the equation of motion form as follows:

$$\ddot{\theta} = \frac{T}{I} - \frac{C\dot{\theta}}{I} - \frac{mar}{I} \text{sine } \theta \quad (4)$$

when $\theta$ is angular displacement as measured from axis $oy'$, T is turbine torque, $C\dot{\theta}$ is viscous damping torque, $mar \sin \theta$ is torque due to mass unbalance and I is moment of inertia. Solution of Equation 4 by numerical methods (since a closed form solution is not available) will yield values of $\Delta t$ and $\tau$ for assigned values of acceleration, $a$. If a family of curves is plotted, as in the idealized case shown in Fig. 4, with acceleration, $a$, as parameter, it could be used to determine acceleration, $a$, when measurements of $\Delta t$ and $\tau$ are given. The data for such curves may be evaluated with the aid of large, general purpose computers. However, the procedure adopted for determining the family of curves in the idealized case is deemed satisfactory for establishing the desired time and acceleration relation. This is because $\tau$ and $\Delta t$ uniquely determine acceleration, $a$, independently of the values of turbine torque T and damping C for the ranges over which T and C are expected to vary. It was found that while variation in the values of T and C will vary the average angular velocity of the rotating pendulum, the family of curves developed for the undamped case may hold equally for the case of nonzero T and C. Mathematically, the curves shown in Fig. 4 were plotted by using the following relationships;

$$\frac{1}{2}\left(1 - \frac{\Delta t}{\tau}\right) = \frac{F(k, \pi/4)}{K(k)} \quad (5)$$

and $$\tau = \frac{4}{\sqrt{P+Q}} K(k) \quad (6)$$

where $$P = \frac{2mar}{I} \quad (7)$$

$$Q = \left(\omega_0^2 - \frac{2mar}{I}\right) \quad (8)$$

$$k = \sqrt{\frac{2P}{P+Q}} \quad (9)$$

while $F(k, \pi/4)$ and $K(k)$ are elliptic integrals of the first kind, $K(k)$ being complete.

If $\Delta t$ and $\tau$ are measured with, $a$, applied to the system, Equation 5 will provide a value for the ratio $F/K$. By elliptic integral theory, this ratio, evaluated at $\theta = \pi/4$, uniquely determines $k$. Once $k$ is known, $K(k)$ is determined, and may be obtained from tables. Equation 6 can then be solved for $\omega_0 = \sqrt{P+Q}$. Then, knowing both $k$ and $\sqrt{P+Q}$, it is possible to solve Equation 9 for $\sqrt{2P}$. Finally, Equation 7 and knowledge of $$\frac{2mar}{I}$$

of the pendulum design permit solution for, $a$. Thus, it has been shown that when damping C and turbine torque T are each zero, measurements of $\Delta t$ and $\tau$ for a given design uniquely determine acceleration, $a$.

Values of $\Delta t$ and $\tau$ are derived in the computer 16 of the accelerometer from the optical transducer 19 the timing circuitry of which simply measures the time between light pulses and feeds this information in digital form to the instrument computer. These light pulses are formed by the slotted disc 9 mounted on the inner cylinder of the sensor.

The diameter of the disc is not critical although larger diameters allow greater angular precision since the light beam interruption will occur near the circumference of the disc. A disc between 3 and 6 inches in diameter is preferred. Its thickness may be small as long as the disc is rigid and will not warp. The material is preferably metallic or metal-coated glass and a photoengraving process may be used to accurately place the slots. The angular spacing between the slots (leading edge to leading edge) should be accurate to about ¼ second of arc and the width of the slots the minimum necessary to pass the light beam and excite the photoelectric pickup on the other side. In its simplest form the slotted disc consists of only two slots displaced 180° apart. In a more complex form three or more slots might be utilized.

The light source should be some reliable unit such as a neon tube (no filament to burn out) with high candle power since only a small fraction of the total candle power will be directed into the transducer lens system. Lenses are used to transmit the light normal to the plane of the slotted disc and then to concentrate the light that passes through the slots onto the photoelectric pickup. Light baffles between the lenses assure that a narrow beam of light plays on the slotted disc.

The sensitive photoelectric pickup is used to receive the light passed through the slotted disc. The D.C. amplifier is triggered by the light beam and will put out a sharp-edge pulse to be fed to the timing circuits.

Figure 7:
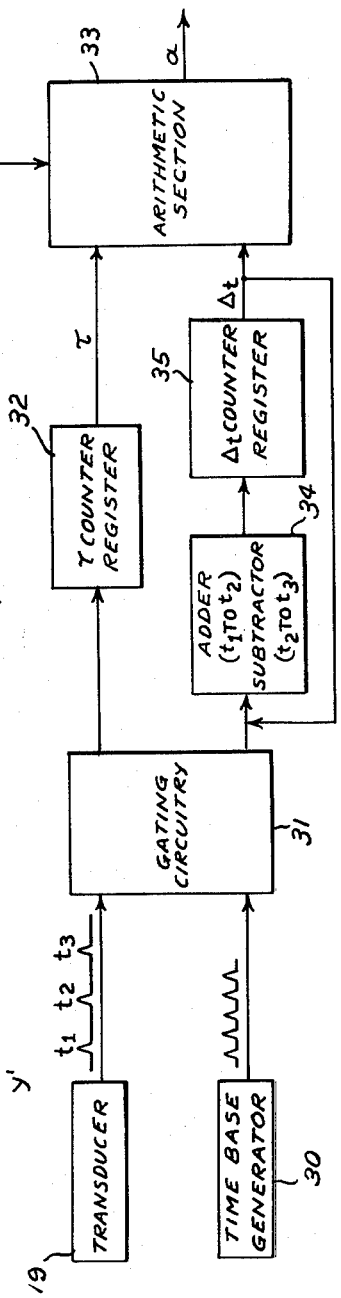
Fig. 7 is a block diagram of the accelerometer computing section.

As indicated above acceleration quantities are derivable in terms of the time quantities $\tau$ and $\Delta t$ so that $a=f(\tau, \Delta t)$. A computing system is, therefore, required which functions to transform the transducer output pulses representing the time difference between light pulses to values for one or both independent variables of the function. There is shown in Fig. 7 an example of one possible embodiment of such a computing system. As there schematically illustrated, precisely generated, time reference pulses are furnished by time base generator 30 and are introduced to gating circuitry 31 which is controlled by the transducer 19. A $\tau$ counter register 32 counts the time reference pulses yielded by the gating circuitry and occurring between, for example, the times $t_1$ and $t_3$ representing, respectively, the times at the beginning and end of a 360° sensor disc revolution. Values of $\tau$ are furnished the arithmetic section 33 of the computer by the register 32.

Reference time pulses are also furnishd adder-subtractor unit 34 which is adapted to add the time pulses produced during the first half revolution of the sensor and to subtract from the resulting sum the number of pulses produced during the second half revolution. The half cycle analog difference pulses are introduced to the $\Delta t$ counter register 35 which counts the pulses and places the quantity, $\Delta t$, into the arithmetic section of the computer.

Memory unit 36 is a storage device, preferably one having magnetic core memory planes which may be used to store the values of the function $f(\Delta t, \tau)$ which relates the variables $\Delta t$ and $\tau$ to acceleration. The analysis of Equations 5-9 given above and the $\Delta t$ versus $\tau$ curves for two different acceleration coefficients demonstrate the existence of the desired mathematical relationship of $a$, $\Delta t$ and $\tau$. The instant computer could, of course, be designed to solve the differential equation relating the three quantities for its unknown coefficient, $a$, but it seems preferable that such solutions be precalculated on large, general purpose computers and the acceleration solutions stored in the memory unit in condition to be read out at the proper time. The instant computer is required to solve a comparatively simple algebraic equation relating, $a$, to $\Delta t$ and $\tau$, which is established in accordance with the solutions to the rather complex differential equations such as was employed to plot the curves shown in Fig. 4. Rather than storing in the memory unit curves representing evaluations of the algebraic equation $a=f(\Delta t, \tau)$, it is, of course, possible to store curves of a versus $\tau$ with $\Delta t$ as a parameter or even the actual expressions which mathematically describe the curves.

The arithmetic section 33 is employed to select the information required, in this instance the precalculated values of $a$, in accordance with its input quantities $\tau$ and $\Delta t$ which are closest to those employed in the precalculations. Additionally the arithmetic section interpolates the read out or selected information and yields acceleration values to its output.

It is understood that various modifications may be made in the described embodiment by persons skilled in the art without departing from the principle or scope of invention. It is envisioned, for example, that the light beam may be processed by the transducer and sensor in a specifically different manner than that which is disclosed, as, for example, by using a polarized light source and providing the sensor with a rotatable analyzer so that nulls spaced 180° apart may be detected. Further, the inner cylinder 12 could be deformed, as by cutting away a section from one area of its surface, for the purpose of achieving the required unbalanced condition. Other modifications may be deemed within the compass of invention providing they do not alter the principle thereof as defined in the appended claims.

What is claimed is:

1. An accelerometer comprising an acceleration responsive sensor having an unbalanced, rotatable element adapted to rotate continuously in one direction when subjected to forces due to the translation of said sensor means by which a uniform rotational torque may be applied to said rotatable element, a transducer adapted to be responsive to the variation in angular velocity of said rotatable element throughout each period of revolution and to generate a signal in accordance therewith and a digital computer connected to receive said signal and adapted to produce a digital output which affords an indication of the translating acceleration of said accelerometer.

2. An accelerometer comprising a light source adapted to project a light beam, an acceleration responsive sensor having an unbalanced, rotatable element, means by which a uniform rotational torque may be applied to said rotatable element, means connected to said element and disposed in the path of said light beam for processing said light in accordance with the angular velocity of said rotatable element, means arranged to receive the processed light and generate a signal which is a function of the variation in angular velocity of said rotating element throughout each period of revolution and a digital computer connected to receive said signal adapted to produce a digital output which affords an indication translating acceleration of said accelerometer.

3. An accelerometer comprising a light source adapted to project a light beam, an acceleration responsive sensor having an unbalanced, rotatable cylinder, means by which said cylinder is adapted to be rotated at substantially a constant angular velocity while said accelerometer is translating at a constant rate and to alter its angular velocity in accordance with the translating acceleration of said accelerometer, means connected to said cylinder and disposed in the path of said light beam for processing said light in accordance with the angular velocity of said rotatable cylinder, means arranged to receive the processed light and generate a signal which is a function of the angular velocity of said rotating cylinder and a digital computer connected to receive said signal and adapted to produce a digital output which affords an indication of the translating acceleration of said accelerometer.

4. An accelerometer comprising a light source adapted to project a light beam, an acceleration responsive sensor having an unbalanced, rotatable cylinder, means by which said cylinder is adapted to be rotated at substantially a constant angular velocity while said accelerometer is translating at a constant rate and to alter its angular velocity in accordance with the translating acceleration of said accelerometer, means connected to said cylinder and disposed in the path of said light beam for processing said light in accordance with the angular velocity of said rotatable cylinder, means arranged to receive the processed light and generate a signal which is a function of the angular velocity of said rotating cylinder and a digital computer connected to receive said signal and adapted to derive therefrom quantities representing the period and half cycle time difference of rotation of said rotatable cylinder and to select digital quantities representing the acceleration of said accelerometer in accordance with said derived quantities.

5. An accelerometer comprising a light source adapted to project a light beam, an acceleration responsive sensor having an outer sleeve, a rotatable cylinder journaled in said sleeve and an unbalanced mass supported by said cylinder, means by which a uniform rotational torque may be applied to said rotatable cylinder, a disc mounted for rotation with said cylinder, said disc having a pair of slots, the slots being angularly spaced 180° and adapted to be disposed in the path of said light beam, means for detecting the light passed by said slots and generating time pulses dependent on the angular velocity of said disc and means for receiving said generated pulses and producing motion information derived therefrom.

6. In an accelerometer, a sensor and transducer arrangement comprising a light source adapted to project a light beam, an acceleration responsive sensor having a rotatable cylinder, an unbalanced mass supported by said cylinder, means connected to said cylinder and disposed in the path of said light beam for processing said light in accordance with the angular velocity of said cylinder, means by which a uniform rotational torque may be applied to said rotatable cylinder, means arranged to receive the processed light and generate a signal indicative of the variation in angular velocity throughout each period of revolution of said cylinder.

7. In an accelerometer, a sensor and transducer arrangement comprising a light source adapted to project a light beam, an acceleration responsive sensor having an outer sleeve, a rotatable cylinder journaled in said sleeve an unbalanced mass supported by said cylinder, means by which a uniform rotational torque may be applied to said rotatable cylinder, a disc mounted for rotation with said cylinder, said disc having a pair of slots, the slots being angularly spaced 180° and adapted to be disposed in the path of said light beam, means for detecting the light passed by said slots and generating time pulses dependent on the angular velocity of said disc.

8. In an accelerometer, an acceleration responsive sensor comprising a cylindrical sleeve, a pair of end caps one of which is secured to each end of said sleeve, a cylinder rotatably mounted in said sleeve, said cylinder having a pair of opposed oppositely extending axial extensions which extend out from said cylinder through bearing apertures in said end caps, and means by which a uniform rotational torque may be applied to said cylinder, a disc secured to one of said axial extensions for rotation therewith, an aperture in said disc through which a beam of light is adapted to be projected each time said aperture intersects said light beam during rotation of said disc, and means associated with said cylinder which is operative to create an unbalanced condition of said cylinder.

9. An acceleration responsive sensor as defined by claim 8 in which said last mentioned means comprises an unbalancing mass carried by each of said axial extensions for rotation therewith.

10. An acceleration responsive sensor as defined by claim 8 in which said last mentioned means comprises a pair of radially extending rods one of which is secured to each of said axial extensions for rotation therewith, and a pair of unbalancing weights one of which is secured to the free end of each of said rods.

References Cited in the file of this patent

UNITED STATES PATENTS

| | | |
|---|---|---|
| 2,077,390 | Blau | Apr. 20, 1937 |
| 2,591,921 | Cosgriff et al. | Apr. 8, 1952 |
| 2,726,074 | Ketchledge | Dec. 6, 1955 |